US009821686B2

(12) United States Patent
Ruthinowski

(10) Patent No.: US 9,821,686 B2
(45) Date of Patent: Nov. 21, 2017

(54) ENHANCED FIXED ANCHOR ACCESSIBILITY FOR CHILD SAFETY SEAT ANCHORS IN A VEHICLE

(71) Applicant: Ford Global Technologies, LLC, Dearborn, MI (US)

(72) Inventor: Richard Edward Ruthinowski, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 14/640,249

(22) Filed: Mar. 6, 2015

(65) Prior Publication Data
US 2016/0257225 A1 Sep. 8, 2016

(51) Int. Cl.
*B60N 2/28* (2006.01)
*B60N 2/64* (2006.01)
*B60N 2/68* (2006.01)

(52) U.S. Cl.
CPC .......... *B60N 2/28* (2013.01); *B60N 2/64* (2013.01); *B60N 2/682* (2013.01)

(58) Field of Classification Search
CPC .. B60N 2/5833; B60N 2/2824; B60N 2/2887; B60N 2/289; B60N 2/2893
USPC ................................................ 297/253, 481
See application file for complete search history.

(56) References Cited

U.S. PATENT DOCUMENTS

| | | | | |
|---|---|---|---|---|
| 4,560,203 A * | 12/1985 | Huber | .................... | B60R 22/02 297/113 |
| 5,918,934 A * | 7/1999 | Siegrist | ................ | B60N 2/2821 296/64 |
| 6,390,560 B1 * | 5/2002 | Gandhi | .................. | B60N 2/289 297/253 |
| 6,547,329 B2 * | 4/2003 | Deptolla | .............. | B60N 2/2827 297/250.1 |
| 6,601,917 B1 * | 8/2003 | Christopherson | .... | B60N 2/2821 24/633 |
| 6,631,958 B1 * | 10/2003 | Herrmann | ............ | B60N 2/2893 297/253 |
| 7,338,121 B1 * | 3/2008 | Pilcher | .................. | B60N 2/0232 297/253 |
| 7,533,934 B2 * | 5/2009 | Foelster | ............... | B60N 2/2893 297/253 |
| 7,699,396 B2 * | 4/2010 | Ghisoni | .................... | B60N 2/58 297/188.2 |
| 8,434,828 B2 * | 5/2013 | Arata | .................... | B60N 2/289 297/353 |

(Continued)

Primary Examiner — Timothy J Brindley
(74) Attorney, Agent, or Firm — LeClairRyan

(57) ABSTRACT

A method and apparatus for displacing a portion of either or both of a vehicle seat back and a seat base to reveal a CRS anchor are disclosed. The inventive concept disclosed herein provides the use of a seat back foam displacing assembly that includes a user-operable actuator, an interface attachment member, and a tension extension member connecting the actuator and the interface attachment member. By moving the user-operable actuator, a portion of either or both of the seat base and the seat back may be displaced allowing visualization of and access to the CRS anchor. Such a system fully satisfies the need to provide easy access to the CRS anchor while fully and aesthetically concealing the anchor when not in use. The actuator may be any one or more of a lever, a handle, or a strap. A tension member guide may optionally be provided.

18 Claims, 12 Drawing Sheets

(56) References Cited

U.S. PATENT DOCUMENTS

| | | | | |
|---|---|---|---|---|
| 8,740,309 B2* | 6/2014 | Kajihara | ............ | B60N 2/58 |
| | | | | 297/452.38 |
| 2004/0051356 A1* | 3/2004 | Neelis | ............ | B60N 2/289 |
| | | | | 297/253 |
| 2004/0084940 A1* | 5/2004 | Morita | ............ | B60N 2/2821 |
| | | | | 297/253 |
| 2005/0046251 A1* | 3/2005 | Foelster | ............ | B60N 2/2893 |
| | | | | 297/253 |
| 2007/0176476 A1* | 8/2007 | Weber | ............ | B60N 2/2893 |
| | | | | 297/253 |
| 2008/0136150 A1* | 6/2008 | Shin | ............ | B60R 21/01556 |
| | | | | 280/735 |
| 2011/0272985 A1* | 11/2011 | Fritz | ............ | B60N 2/2806 |
| | | | | 297/253 |
| 2013/0147246 A1* | 6/2013 | Nakakita | ............ | B60N 2/2893 |
| | | | | 297/253 |
| 2016/0144751 A1* | 5/2016 | Asaeda | ............ | B60N 2/58 |
| | | | | 297/253 |
| 2016/0257229 A1* | 9/2016 | Ruthinowski | ............ | B60N 2/28 |

* cited by examiner

ENHANCED FIXED ANCHOR ACCESSIBILITY FOR CHILD SAFETY SEAT ANCHORS IN A VEHICLE

TECHNICAL FIELD

The disclosed inventive concept relates generally to vehicle seats and safety systems. More particularly, the disclosed inventive concept relates to a method and system for selectively and strategically moving seat foam or seat trim to expose anchors for child safety seat.

BACKGROUND OF THE INVENTION

Child Restraint Systems (CRS) are becoming increasingly used in a variety of markets including some where safety qualifications include anchor accessibility for such systems. Use of the CRS is becoming increasingly popular in automotive vehicles. Today, various state and federal rules and guidelines specify that children of certain ages should be seated in Child Restraint Systems (CRS) or in a booster seat. For example, the National Highway Traffic Safety Administration recommends that children from birth to three years old be positioned in a rear-facing car seat, while children between the ages of one year to seven years be seated in a forward-facing car seat. Booster seats are recommended for children between the ages of four and 12 years. Age variations for these recommendations are due to such factors as height and weight for the individual child.

However, CRS anchors for vehicles are often not readily visible and/or accessible in some vehicles. While a child anchor identification symbol (such as a tag or button) is often included on the vehicle seatback to aid vehicle users in identifying the approximate anchor locations, accessibility is nonetheless often limited as the anchor may be located behind or under seat foam and trim that must be displaced to see and access the anchors for CRS installation or removal.

Anchor conditions such as these increase difficulty of installation and removal based on limited visibility and hand clearance to an anchor sandwiched snugly between seat foam/trim and seat frame or vehicle structures. Disconnecting a CRS can be especially challenging when attempting to release a spring clip engagement from a child seat webbing strap hook without being able to see, or having finger access clearance to, the anchor for a child seat cinched tightly to the vehicle seat.

Accordingly, a practical and cost-effective solution to the use of CRS anchors in today's motor vehicle remains wanting.

SUMMARY OF THE INVENTION

The disclosed inventive concept provides a solution to the need for concealing CRS anchors while simultaneously making them readily accessible to the consumer. The inventive concept disclosed herein provides the use of a seat back foam displacing assembly that includes a user-operable actuator, an interface attachment member, and an extension connecting the actuator and the interface attachment member. By moving the user-operable actuator, a portion of either or both of the seat base and the seat back may be displaced allowing visualization of and access to the CRS anchor. Such a system fully satisfies the need to provide easy access to the CRS anchor while fully and aesthetically concealing the anchor when not in use.

Thus the disclosed inventive concept enhances the ease of installing a CRS into a vehicle, particularly in the rear row seats of the vehicle. The system of the disclosed inventive concept provides improved accessibility to lower child restraint anchors for parents without affecting seating comfort or anchor performance. This results in improved customer satisfaction and provides an improved, real-world usage condition beyond the details commonly provided in vehicle and CRS OEM instruction manuals. The disclosed inventive concept provides an alternative to systems that provide for manual operation or electronic signal-based, solenoid/axle/gear/shaft driven linear or rotationally operating mechanisms that move CRS anchors at the bight line of a vehicle seat. Such systems are meant to "present" the otherwise hidden anchors to provide enhanced customer accessibility and to simplify installation/removal of child seats and enhance "correctness" of installation.

The concepts presented herein avoid complexity associated with multi-position anchors and bypass the need for multi-position anchor misuse design prevention for non-road use or out-of-zone anchor positions. The overall goal of the disclosed inventive concept is to change the current approach of "presenting" CRS anchors by moving them to an accessible position to displacing either or both of a portion of the seat back and the seat base to reveal the CRS anchor.

This approach avoids changing vehicle seat structure and anchor design or load paths. By avoiding the need to move the CRS anchor to a position of accessibility, complex mechanisms such as sensors, interlocks, positional control features, gears, axles, motors, drive shafts, solenoids and the like are rendered unnecessary. In addition, there is no need to consider package specific zone limitations for multi-position anchors.

According to the disclosed inventive concept, no seat or body structural changes are required. There is no need for motors, solenoids, or added structure and there is no need to revisit the anchor load carrying capability or the vehicle specific content/package limitations. Furthermore, there is no need to incorporate sensors, to maintain tight functional tolerances, or to ensure the same level of robustness relative to production build variation. The package space required for the disclosed inventive is minimal, the cost is low and the approach is relatively simple. The result is enhanced accessibility and customer satisfaction while improving accuracy of consumer installations.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
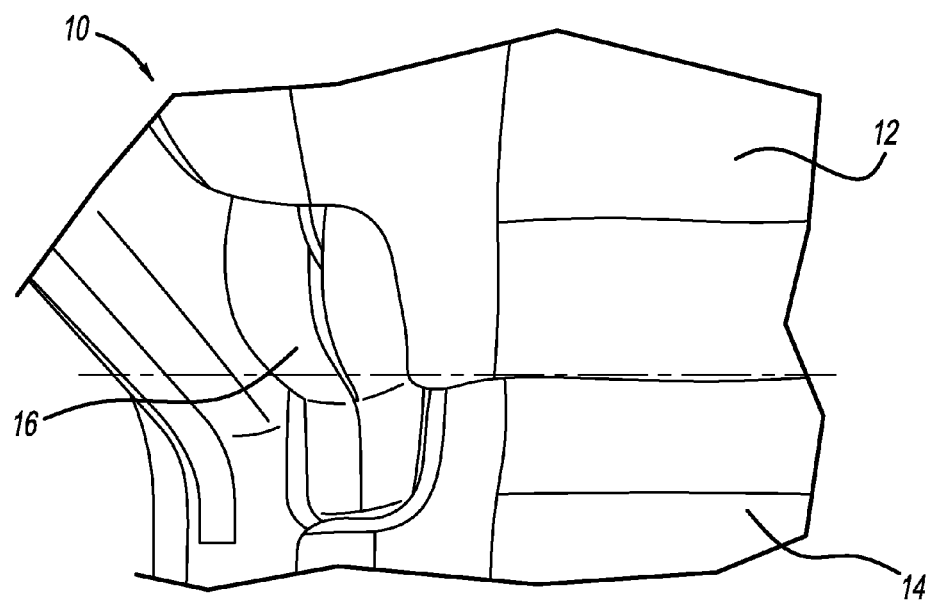
FIG. 1 is a top view of a portion of a vehicle seat having CRS anchors that are hidden by the vehicle seat back according to current technology.

In the following figures, the same reference numerals will be used to refer to the same components. In the following description, various operating parameters and components are described for different constructed embodiments. These specific parameters and components are included as examples and are not meant to be limiting.

Figure 2:
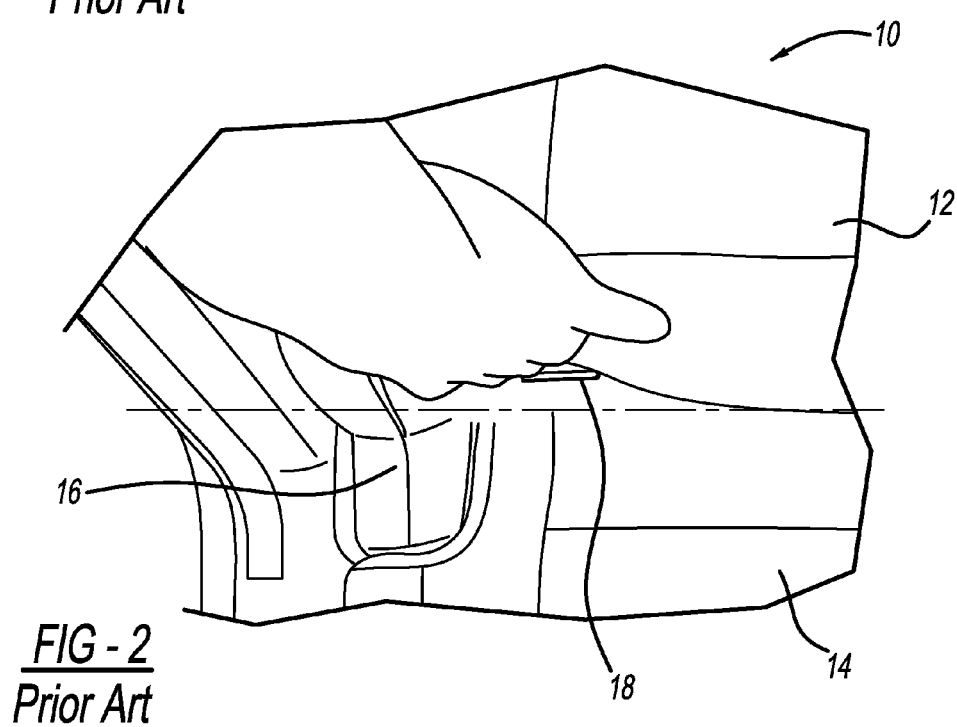
FIG. 2 is the view of FIG. 1 but showing the hand of an operator physically manipulating the vehicle seat back to access the CRS anchor according to current technology.

FIGS. 1 and 2 illustrate an example of known vehicle seat technology having CRS anchors that are hidden by the seat back. The illustrated seat anchor or package, generally illustrated as 10, is typical of known arrangements. The seat anchor or package 10 includes a seat back 12 and a seat base 14. The seat back 12 and the seat base 14 may be joined by a hinge 16 or may be anchored to the vehicle by known methods.

Typical of the known seat anchor or package 10, a CRS anchor 18 is purposefully hidden from view as shown in FIG. 1. Access to the CRS anchor 18 is accomplished by physical movement of a portion of the seat back 12 so that it is out of the way of the CRS anchor 18 as illustrated in FIG. 2. This figure illustrates the inconvenience involved with the need for the user to physically displace a portion of the seat back 12 in order to gain access to the CRS anchor 18. Known designs present a challenge in attaching the CRS clip (not shown) to the CRS anchor 18 and an even greater challenge in removing the CRS clip because displacement of the portion of the seat back 12 needed to allow access to the CRS anchor 18 is made even more difficult by the presence of the CRS on the vehicle seat.

Figure 3:
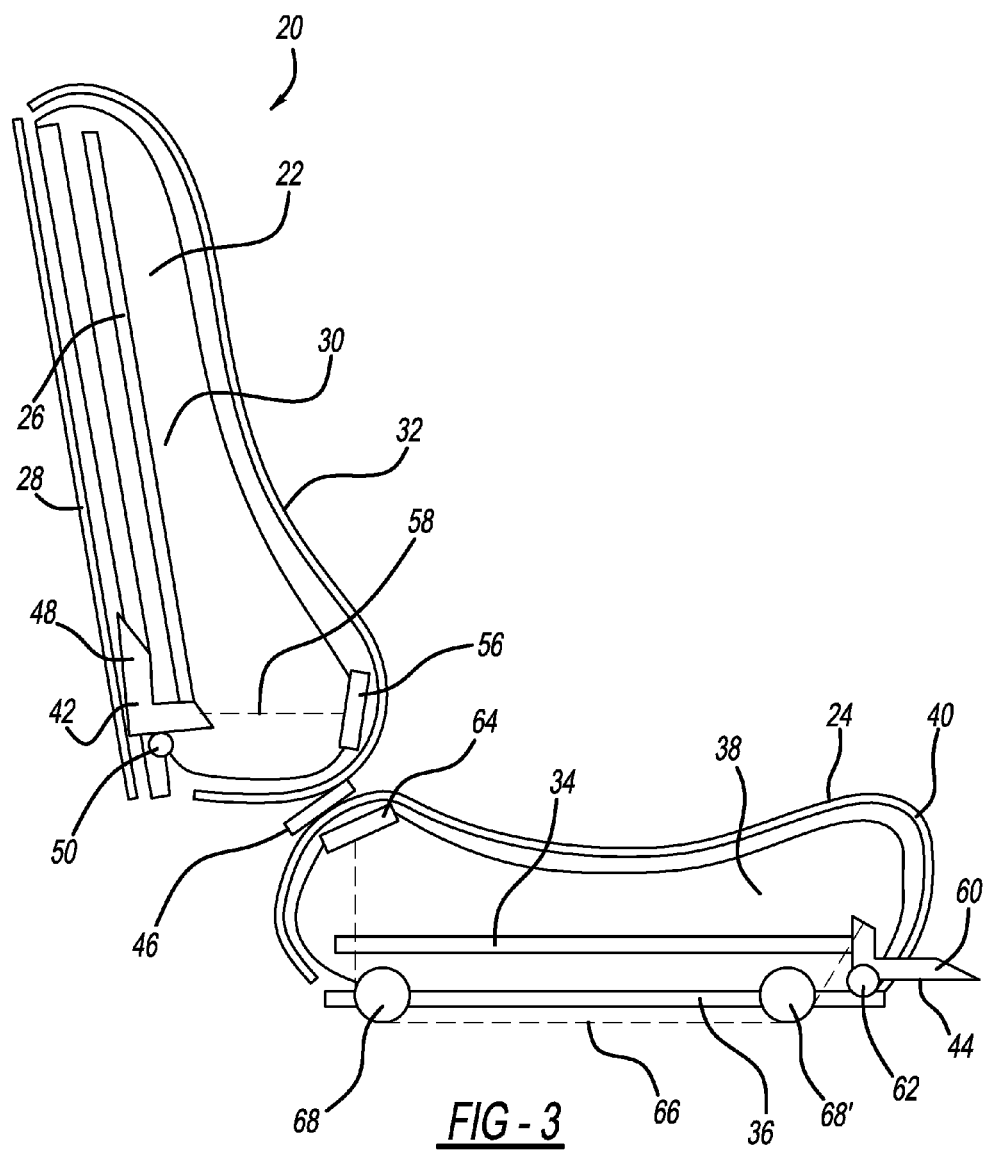
FIG. 3 is a sectional side view of a vehicle seat illustrating the arrangement for drawing in portions of the seat back and the seat base to reveal the CRS anchor, the arrangement including two levers according to a first embodiment of the disclosed inventive concept, the levers shown in their resting positions.
Figure 4:
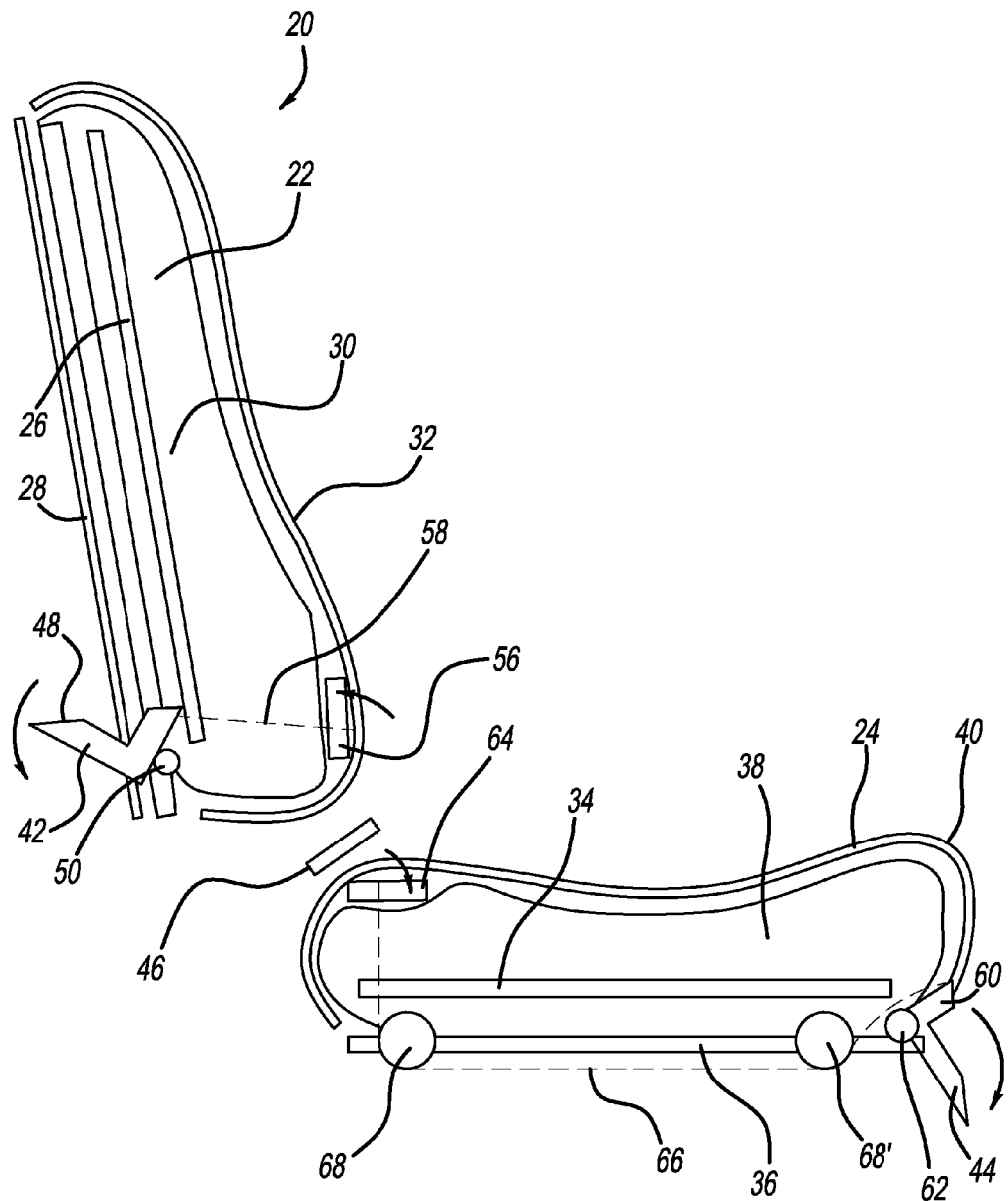
FIG. 4 is a view similar to that of FIG. 3 but illustrating the two levers moved to their operating positions whereby portions of the seat back and the seat base are drawn in to reveal the CRS anchor.
Figure 5:
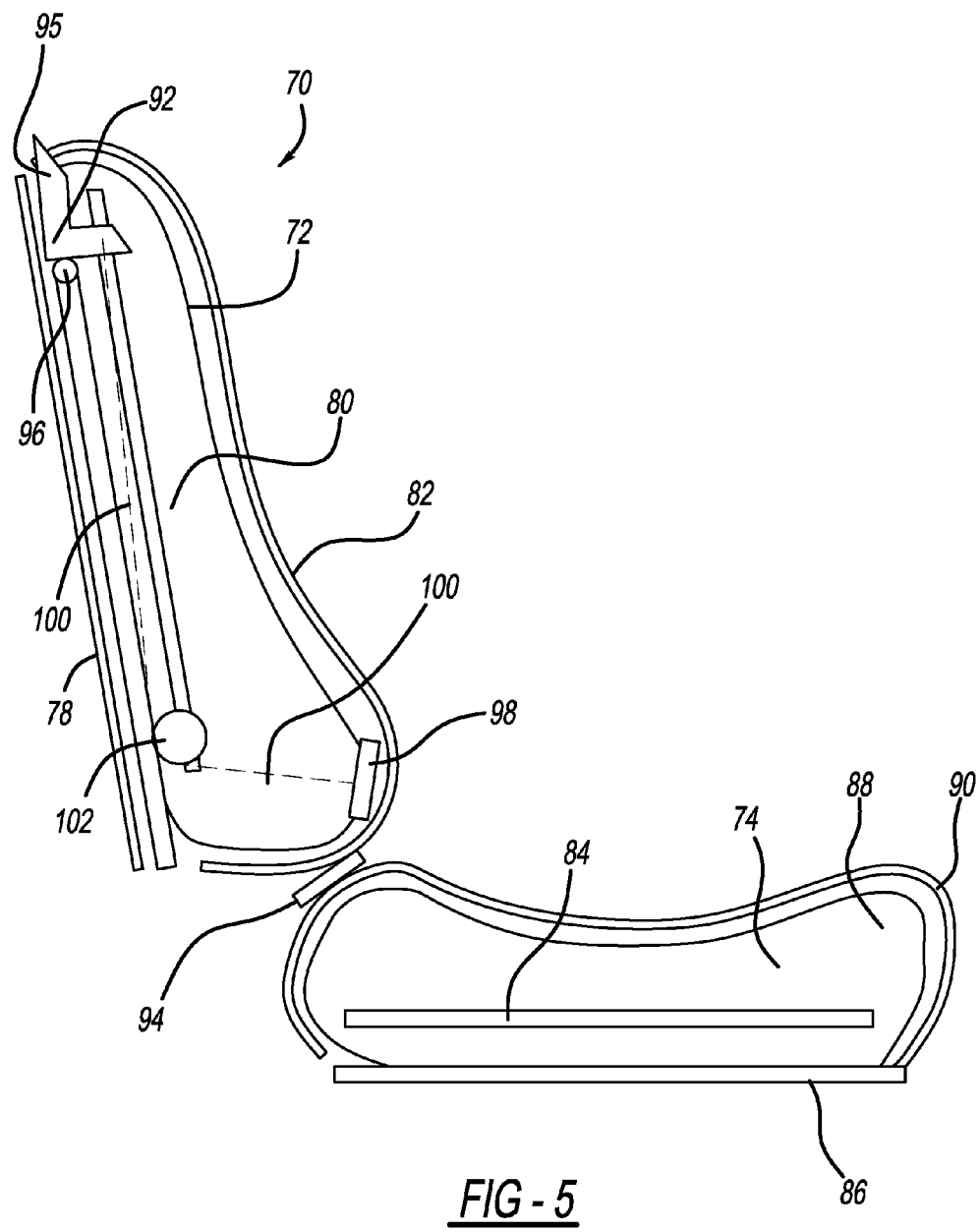
FIG. 5 is a sectional side view of a vehicle seat illustrating the arrangement for drawing in a portion of the seat back to reveal the CRS anchor, the arrangement including a single levers according to a second embodiment of the disclosed inventive concept, the lever shown in its resting position.
Figure 6:
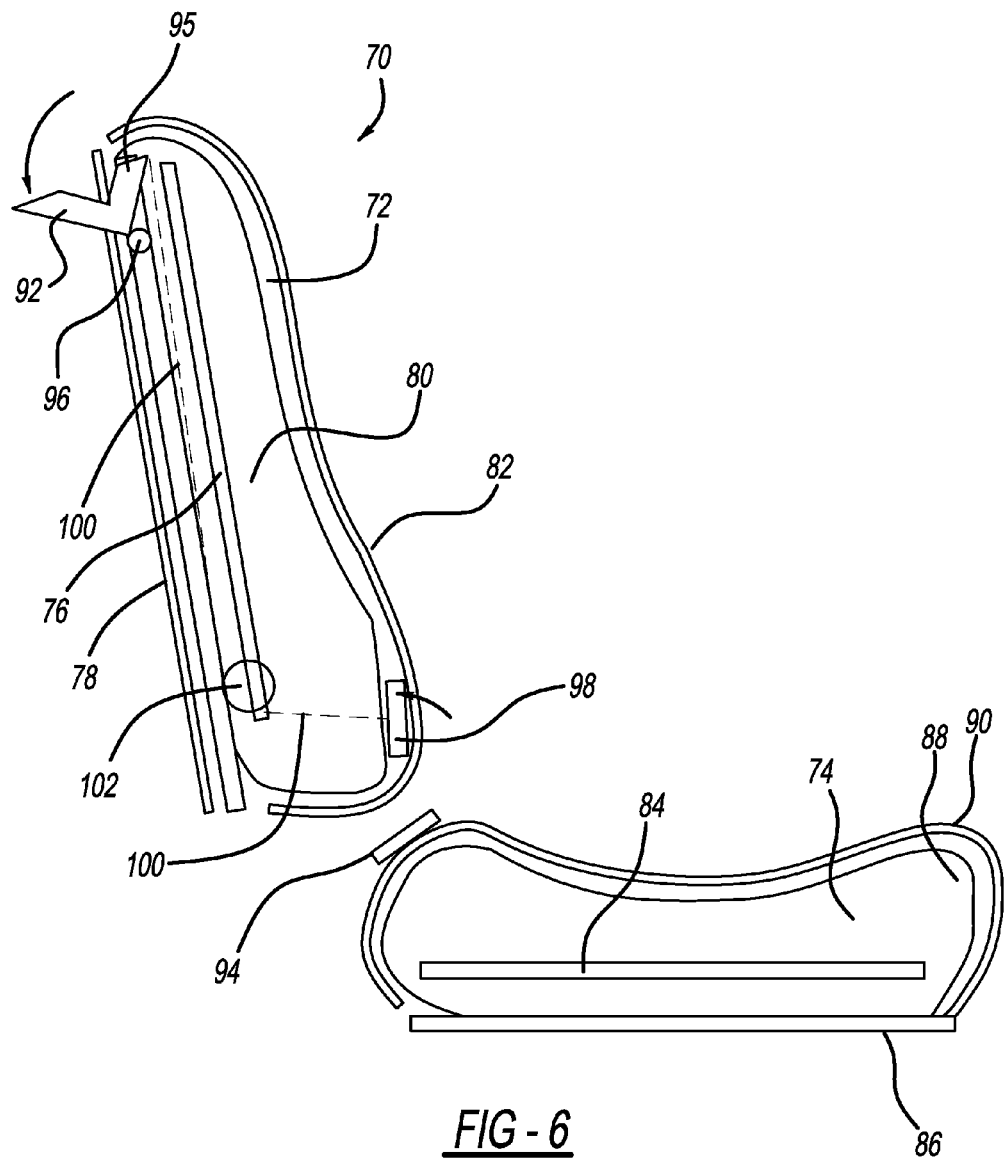
FIG. 6 is a view similar to that of FIG. 5 but illustrating the lever moved to its operating position whereby a portion of the seat back is drawn in to reveal the CRS anchor.
Figure 7:
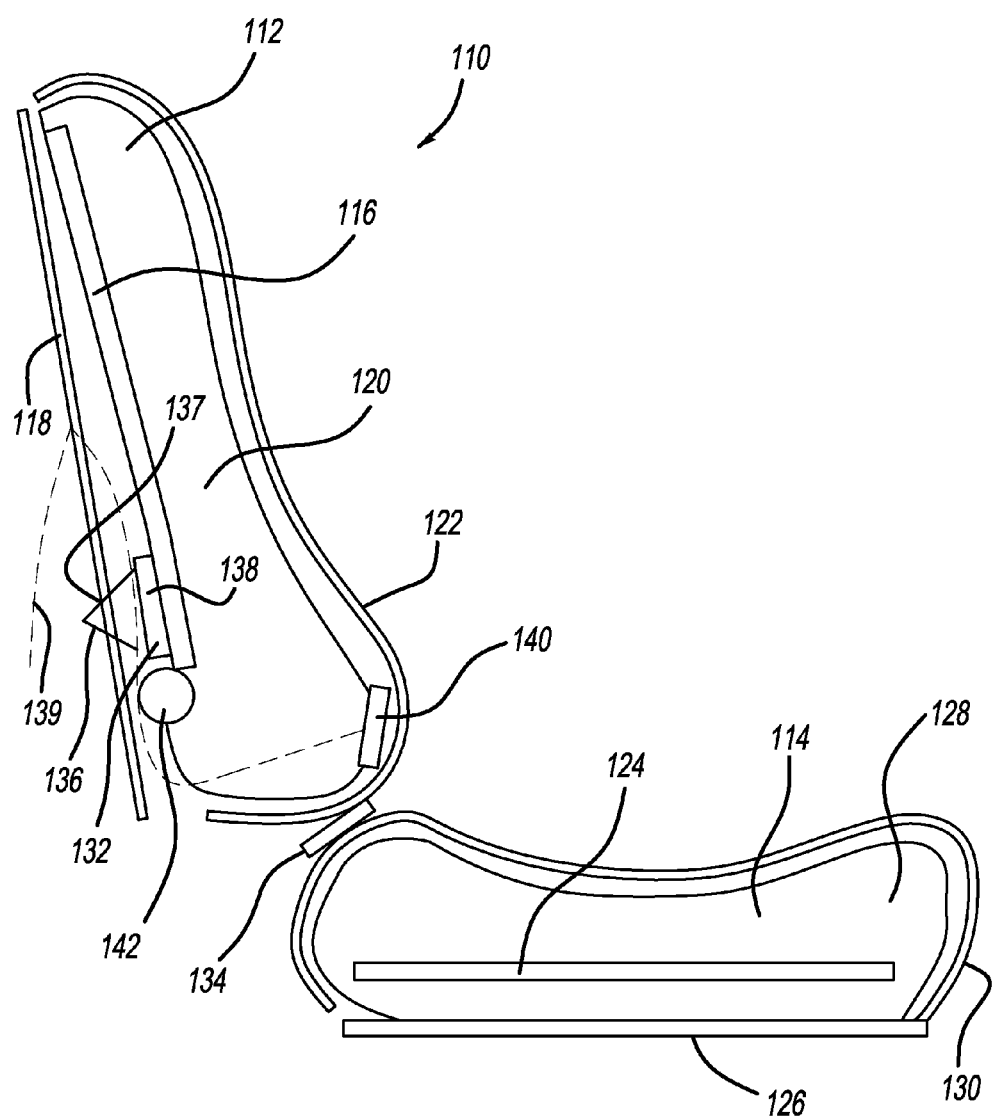
FIG. 7 is a sectional side view of a vehicle seat illustrating the arrangement for drawing a portion of the vehicle seat back illustrating a tether strap an associated tether strap locking mechanism in its resting position according to a third embodiment of the disclosed inventive concept.
Figure 8:
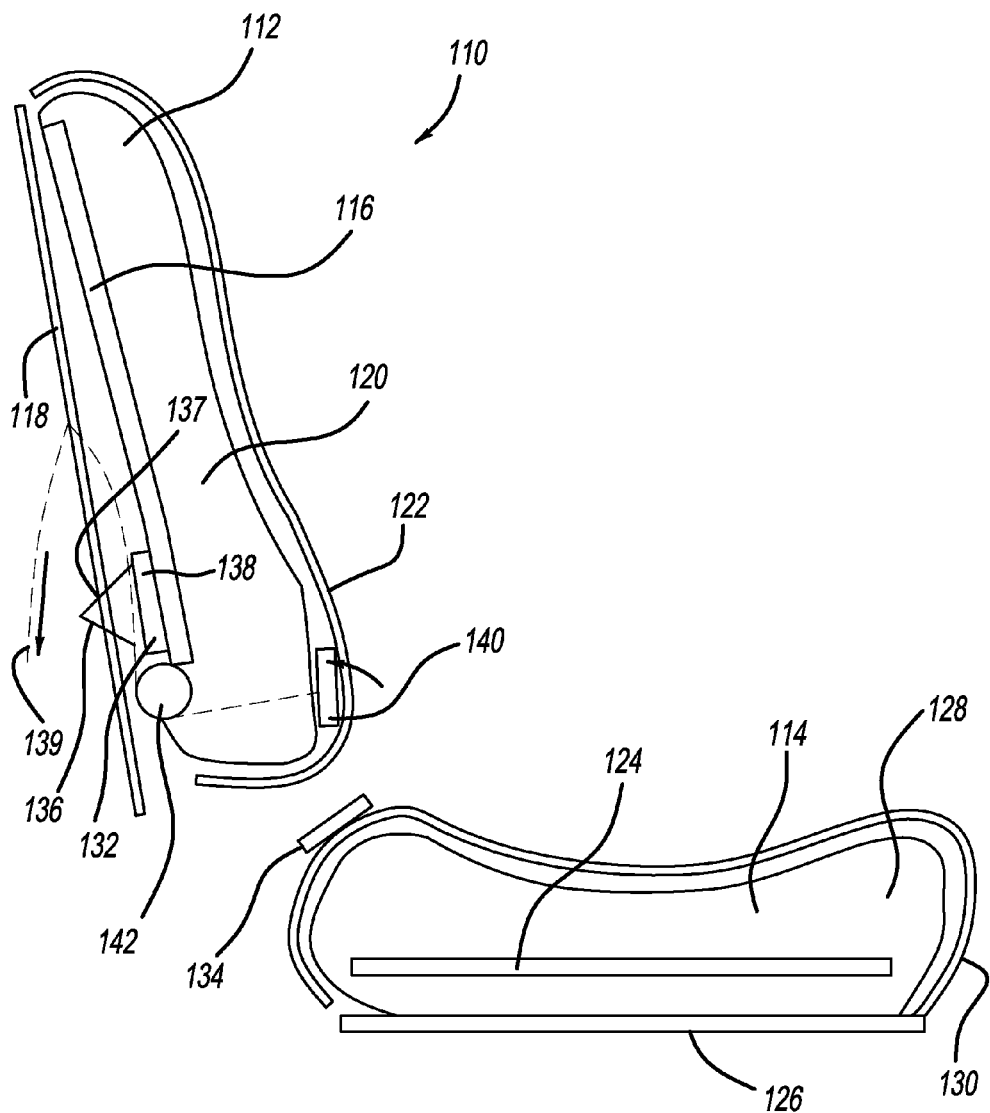
FIG. 8 is a view similar to that of FIG. 7 but illustrating the tether strap moved to and locked in its operating position whereby a portion of the seat back is drawn in to reveal the CRS anchor.
Figure 9:
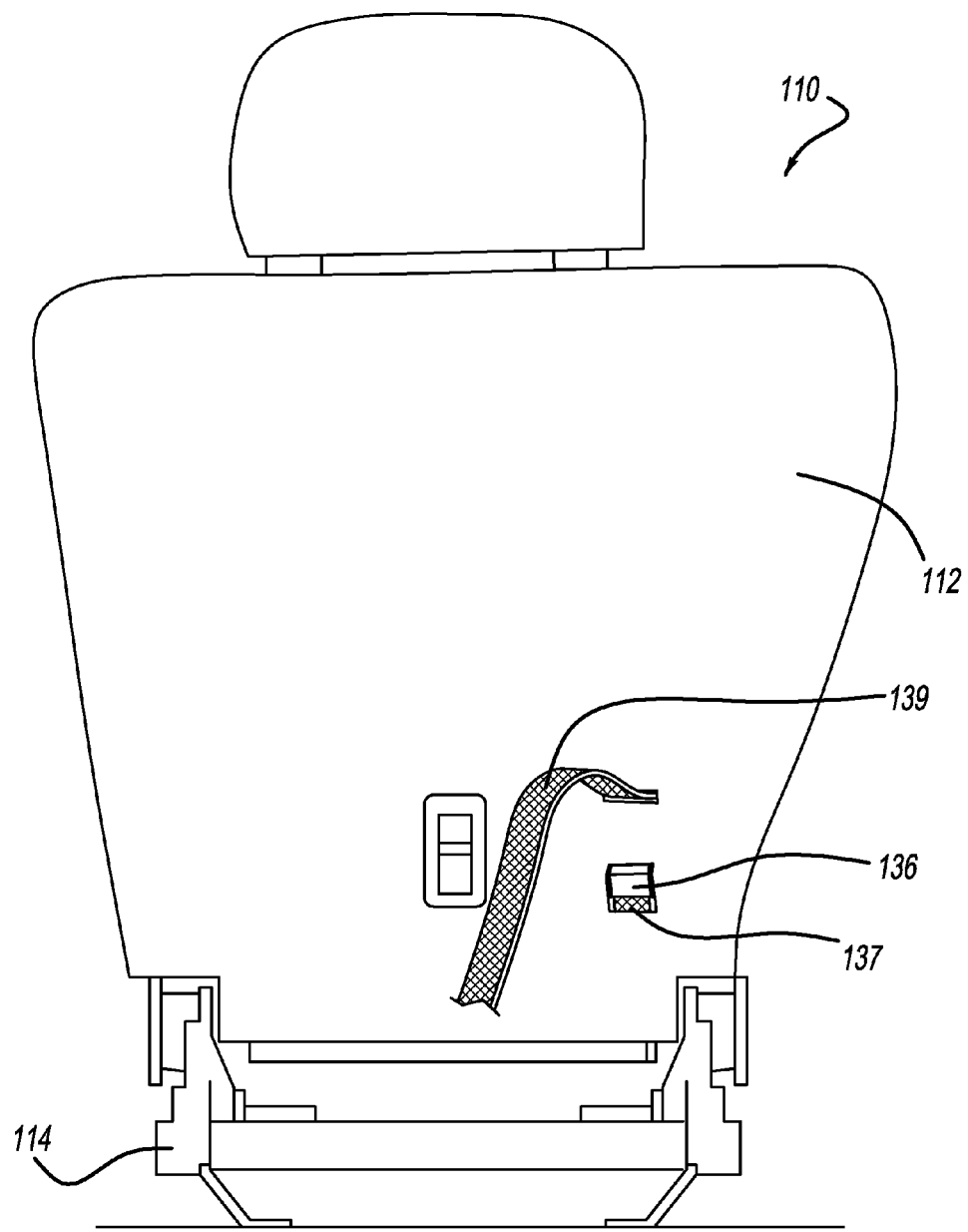
FIG. 9 is a rear view of the seat back of the seat of FIGS. 7 and 8 illustrating the tether strap for drawing in a portion of the seat back to allow access to the CRS anchor.
Figure 12:
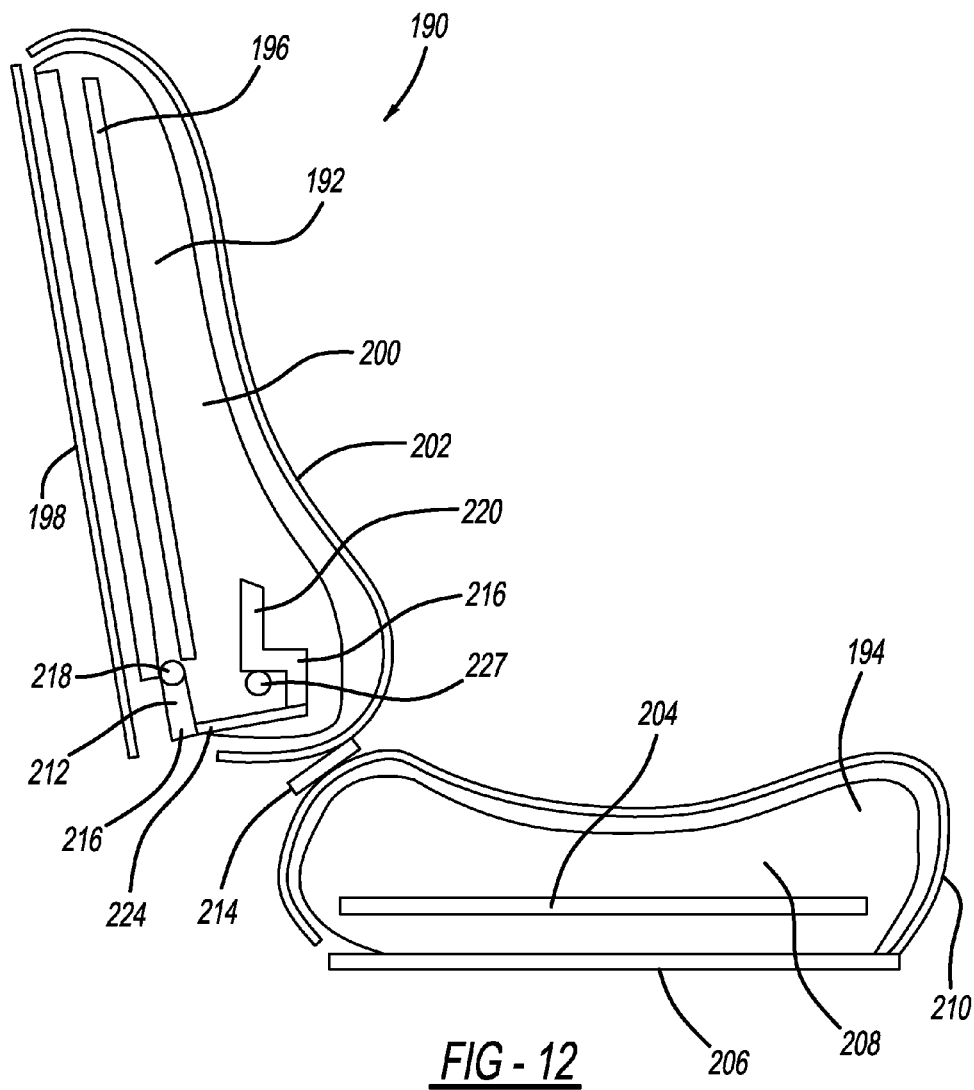
FIG. 12 is a sectional side view of a vehicle seat illustrating the arrangement for drawing in a portion of the seat back to reveal the CRS anchor, the arrangement including a lever linked to a pivotable member attached to the lower portion of the front of the seat back shown in its resting position according to a fourth embodiment of the disclosed inventive concept.
Figure 13:
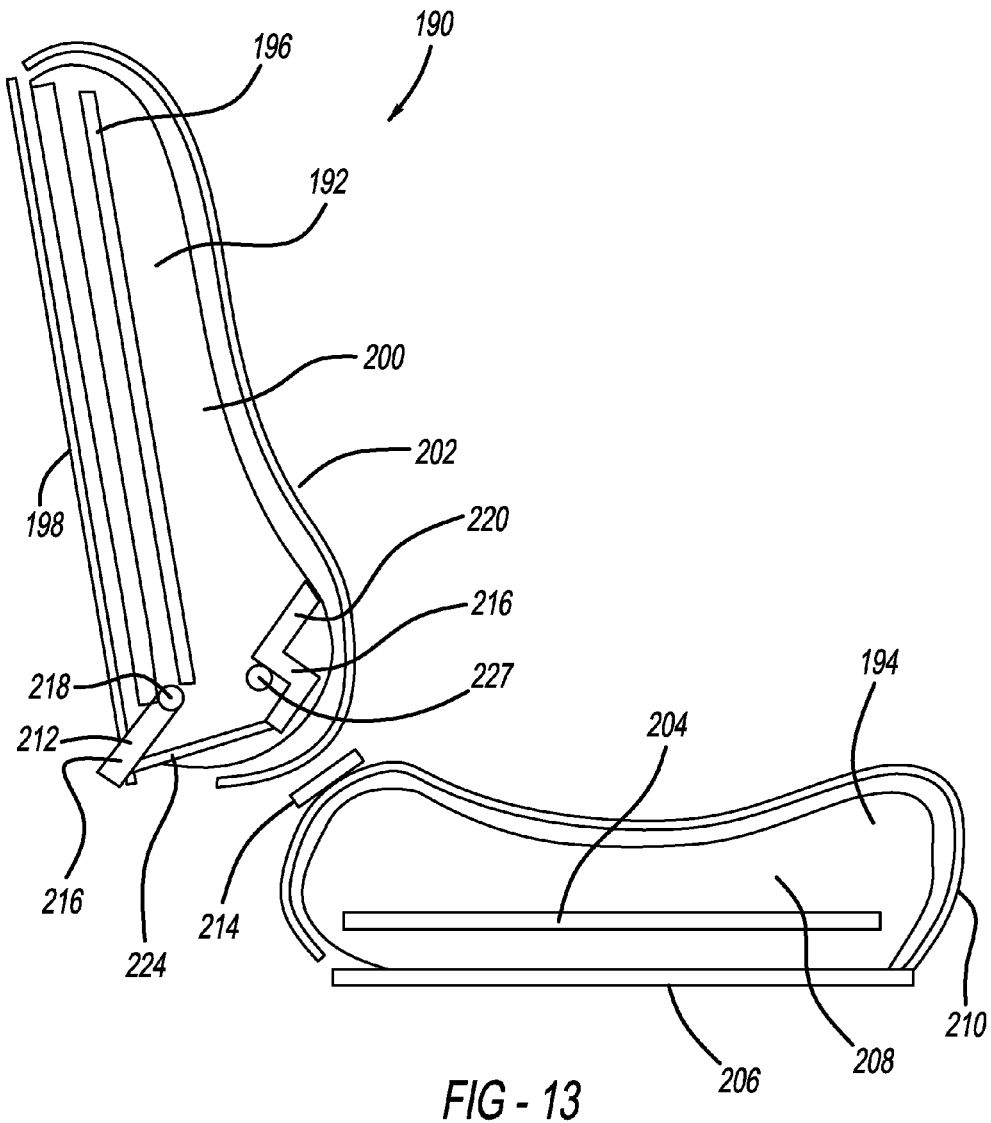
FIG. 13 is a view similar to that of FIG. 12 but illustrating the lever moved to its operating position whereby a portion of the seat back is drawn in to reveal the CRS anchor.

The disclosed inventive concept provides a general solution to the problem encountered by the user of today's vehicle seat when trying to attach a CRS to the CRS anchor. The general solution is presented herein in four embodiments of the disclosed inventive concept. Particularly, FIGS. 3 and 4 illustrate a first embodiment, FIGS. 5 and 6 illustrate a second embodiment, FIGS. 7, 8 and 9 illustrate a third embodiment, FIGS. 10 and 11 relate to the embodiment of FIGS. 7, 8 and 9 by illustrating a locking mechanism for locking a tether strap, and FIGS. 12 and 13 illustrate a fourth embodiment. It is to be understood that these embodiments of the disclosed inventive concept are not intended as being limiting as it is to be understood that variations of these embodiments are envisioned.

A common characteristic of the four embodiments of the disclosed inventive concept is the interfacing attachment member that is provided to mechanically displace a portion of the seat back (or the seat base) to allow easy access to the CRS anchor. The interfacing attachment member may consist of something as simple as a stitching sewn into the trim cover, or a plastic, cloth or alternative material sewn or otherwise inserted, embedded or attached to one of the trim cover (presumably a B-surface so not to be cosmetically visible to the user), the seat cushion or seat back foam beneath the trim cover, or both of a trim cover and the foam covered thereby, in combination.

Additional common characteristics of the four embodiments of the disclosed inventive concept include the tension extension member, the actuator, and the optional tension member guide. The tension extension member may be, for example, one or more of a strap, a cable, a string, a wire, or a tether. The actuator may be, for example, any one or more of a lever, a handle, or a strap. The optional tension member guide may be, for example, any one or more of a guide sleeve, a pulley, a channel, or a slot. The optional tension member guide may include a smooth surface or may have a friction- and wear-reducing surface. The optional tension member guide may be either an existing surface on the seat frame or seat structure or may be a purpose-specific attachment.

Referring to FIGS. 3 and 4, a sectional view of a seat according to the first embodiment of the disclosed inventive concept, generally illustrated as 20, is shown. The seat 20 includes a seat back 22 and a seat base 24. The seat 20 may be of any of a variety of seats and may include an external skeleton upon which the molded foam rests in or against, an external surface such as the sheet metal second row seat in a sedan (below the package tray, for example), and an internal wireframe skeleton over which the foam is molded.

According to the illustrated seat 20, the non-limiting arrangement for the seat back 22 is an internal seat back frame 26 and an external seat back frame 28. The seat back 22 further includes a seat back foam 30 and seat back trim 32. The non-limiting arrangement for the seat base 24 is an internal seat base frame 34 and an external seat base frame 36. The seat base 24 further includes a seat base foam 38 and a seat base trim 40.

The seat 20 of the first embodiment of the disclosed inventive concept illustrated in FIGS. 3 and 4 includes a seat back foam displacing assembly 42 and a seat base foam displacing assembly 44. A CRS anchor 46 is fitted approximately between the seat back 22 and the seat base 24.

The seat back foam displacing assembly 42 includes an actuator 48 in the form of a lever that is pivotably attached to the seat back 22 by an actuator pivot 50. The actuator lever 48 is attached to a seat back interfacing attachment member 56 by a seat back extension member 58.

The seat base foam displacing assembly 44 includes an actuator 60 in the form of a lever that is pivotably attached to the seat base 24 by an actuator pivot 62. The actuator lever 60 is attached to a seat base interfacing attachment member 64 by a seat base extension member 66. The seat base attachment member 66 is guided by a pair of spaced apart tension member guides 68 and 68'.

When in its non-displaced state as illustrated in FIG. 3, the CRS anchor 46 is hidden from view by portions of both the seat back 22 and the seat base 24. To gain access to the CRS anchor 46, portions of both the seat back 22 and the seat base 24 are displaced so that the CRS anchor 46 becomes visible as illustrated in FIG. 4.

To displace portions of the seat back 22 and the seat base 24, the operator manipulates one or the other or both of the actuator lever 48 or the actuator lever 60 from their resting, non-displacing positions shown in FIG. 3 to their active, displacing positions shown in FIG. 4. If the user chooses to operate the seat back foam displacing assembly 42, the actuator lever 48 is rotated from the position illustrated in FIG. 3 to the position illustrated in FIG. 4. Movement of the actuator lever 48 causes the seat back extension member 58 to act on the seat back interfacing attachment member 56, thus displacing a portion of the seat back 22 so that it is moved out of the line of sight of the user.

If the user chooses to operate the seat base foam displacing assembly 44, the actuator lever 60 is rotated from the position illustrated in FIG. 3 to the position illustrated in FIG. 4. Movement of the actuator lever 60 causes the seat base extension member 66 to act on the seat base interfacing attachment member 64, thus displacing a portion of the seat base 24 so that it is moved out of the line of sight of the user.

It should be noted that, with respect to the first embodiment illustrated in FIGS. 3 and 4, it is not necessary that both of the seat back foam displacing assembly 42 and the seat base foam displacing assembly 44 be provided in the same vehicle or even in all of the seats within a single vehicle. It should also be noted that, while actuator lever 48 and actuator lever 60 are shown as pivotable handles, other hand-operable devices may be used instead.

Referring to FIGS. 5 and 6, a sectional view of a seat according to the second embodiment of the disclosed inventive concept, generally illustrated as 70, is shown. The seat 70 includes a seat back 72 and a seat base 74. The seat 70 may be of any of a variety of seats and may include an external skeleton upon which the molded foam rests in or against, an external surface such as the sheet metal second row seat in a sedan (below the package tray, for example), and an internal wireframe skeleton over which the foam is molded.

According to the illustrated seat 70, the non-limiting arrangement for the seat back 72 is an internal seat back frame 76 and an external seat back frame 78. The seat back 72 further includes a seat back foam 80 and seat back trim 82. The non-limiting arrangement for the seat base 74 is an internal seat base frame 84 and an external seat base frame 86. The seat base 74 further includes a seat base foam 88 and a seat base trim 90.

The seat 70 of the second embodiment of the disclosed inventive concept illustrated in FIGS. 5 and 6 includes a seat back foam displacing assembly 92. A CRS anchor 94 is fitted approximately between the seat back 72 and the seat base 74.

The seat back foam displacing assembly 92 includes an actuator 95 in the form of a lever that is pivotably attached to the seat back 72 by an actuator pivot 96. The actuator lever 95 is attached to a seat back interfacing attachment member 98 by a seat back extension member 100. A tension member guide 102 is preferably though not absolutely provided against which the seat back extension member 100 travels.

When in its non-displaced state as illustrated in FIG. 5, the CRS anchor 94 is hidden from view by portions of both the seat back 72 and the seat base 74. To gain access to the CRS anchor 94, a portion of the seat back 72 is displaced so that the CRS anchor 94 becomes visible as illustrated in FIG. 6.

To displace the portion of the seat back 72, the operator manipulates the actuator lever 95 from its resting, non-displacing position shown in FIG. 5 to its active, displacing position shown in FIG. 6. Particularly, to allow access to the CRS anchor 94, the user rotates the actuator lever 95 from the position illustrated in FIG. 5 to the position illustrated in FIG. 6. Movement of the actuator lever 95 causes the seat back extension member 100 to act on the seat back interfacing attachment member 98, thus displacing a portion of the seat back 72 so that it is moved out of the line of sight of the user.

Referring to FIGS. 7 and 8, a sectional view of a seat according to the third embodiment of the disclosed inventive concept, generally illustrated as 110, is shown. FIG. 9 is a view of the back of the seat 110 of FIGS. 7 and 8. The seat 110 includes a seat back 112 and a seat base 114. As noted above with respect to the first two embodiments of the disclosed inventive concept, the seat 110 may be of any of a variety of seats and may include an external skeleton upon which the molded foam rests in or against, an external surface such as the sheet metal second row seat in a sedan (below the package tray, for example), and an internal wireframe skeleton over which the foam is molded.

According to the illustrated seat 110, the non-limiting arrangement for the seat back 112 is an internal seat back frame 116 and an external seat back frame 118. The seat back 112 further includes a seat back foam 120 and seat back trim 122. The non-limiting arrangement for the seat base 114 is an internal seat base frame 124 and an external seat base frame 126. The seat base 114 further includes a seat base foam 128 and a seat base trim 130.

The seat 110 of the second embodiment of the disclosed inventive concept illustrated in FIGS. 7 and 8 includes a seat back foam displacing assembly 132. A CRS anchor 134 is fitted approximately between the seat back 112 and the seat base 114.

The seat back foam displacing assembly 132 includes a tether strap adjuster 136 as opposed to the actuator levers of the previous two embodiments. The tether strap adjuster 136 includes a spring-loaded, pivoting v-shaped catch 137 and a tether locking plate 138. The tether strap adjuster 136 selectively locks and holds a tether strap 139 by providing to the tether strap 139 by capturing a portion of the tether strap 139 between the pivoting v-shaped catch 137 and the tether locking plate 138. The tether strap adjuster 136 is preferably mounted to the external seat base frame 126, although attachment locations are possible.

A seat back displacing assembly 140 is provided in the lower forward portion of the seat back 120. The tether strap 139 is connected to the seat back displacing assembly 140. A tether strap guide 142 is provided that is preferably a pre-existing member of seat back 120.

When in its non-displaced state as illustrated in FIG. 7, the CRS anchor 134 is hidden from view by portions of both the seat back 112 and the seat base 114. To gain access to the CRS anchor 134, a portion of the seat back 112 is displaced so that the CRS anchor 134 becomes visible as illustrated in FIG. 8.

To displace the portion of the seat back 112, the operator manipulates the tether strap adjuster 136 from its resting, non-displacing position shown in FIG. 7 to its active, displacing position shown in FIG. 8. Particularly, to allow access to the CRS anchor 134, the user pulls up on the tether strap 139 thus moving the seat back displacing assembly 140 from the position illustrated in FIG. 7 to the position illustrated in FIG. 8, thus displacing a portion of the seat back 112 so that it is moved out of the line of sight of the user and the CRS anchor 134 is revealed. To release the tension of the tether strap adjuster 136, the user pushes pivoting v-shaped catch 137 moving it away from the tether locking plate 138 and releasing tension on the tether strap 139.

Figure 10:
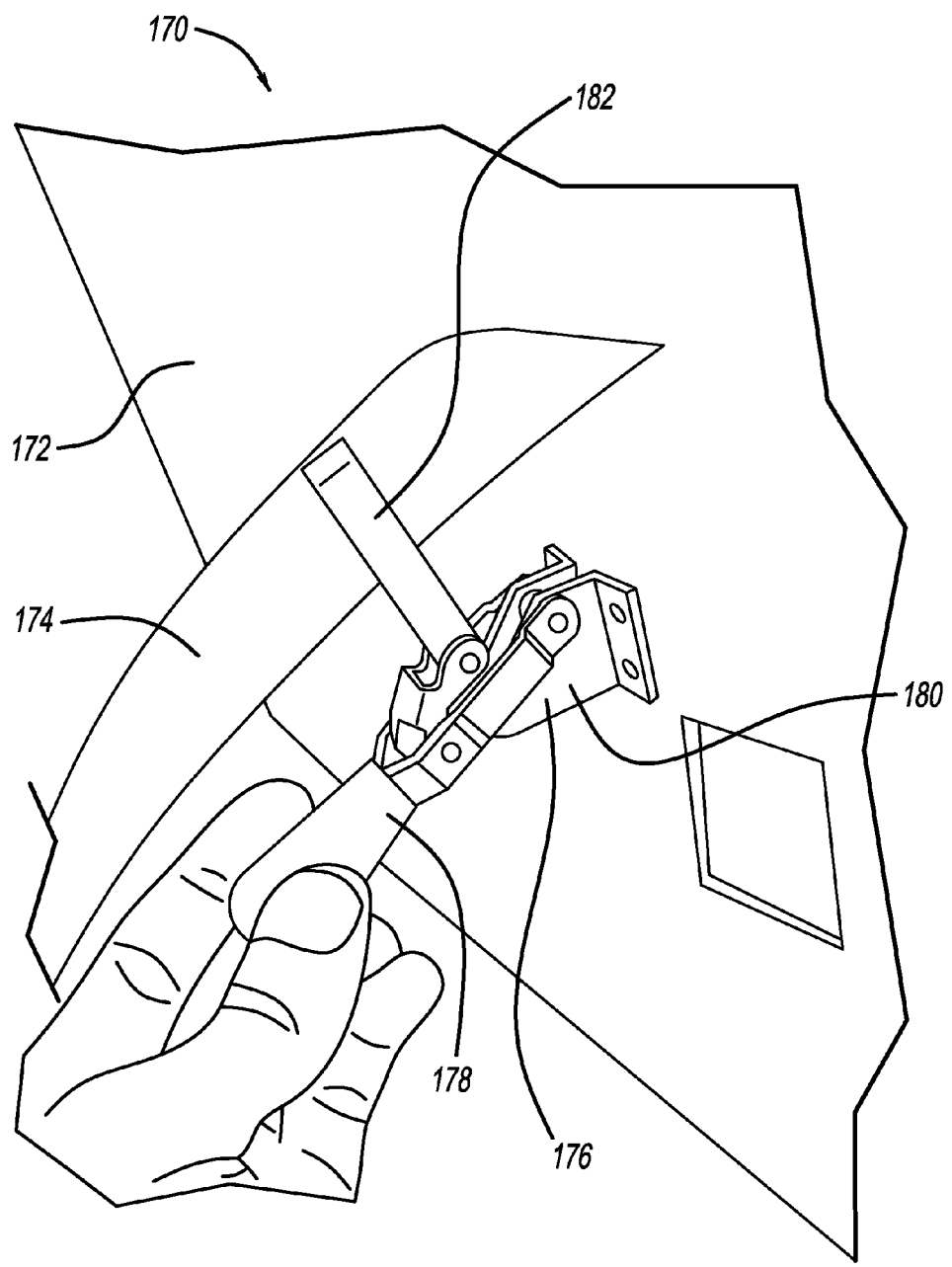
FIG. 10 is a view of a portion of the rear of the vehicle seat back illustrating the tether strap of FIGS. 7 and 8 having an alternative locking mechanism.
Figure 11:
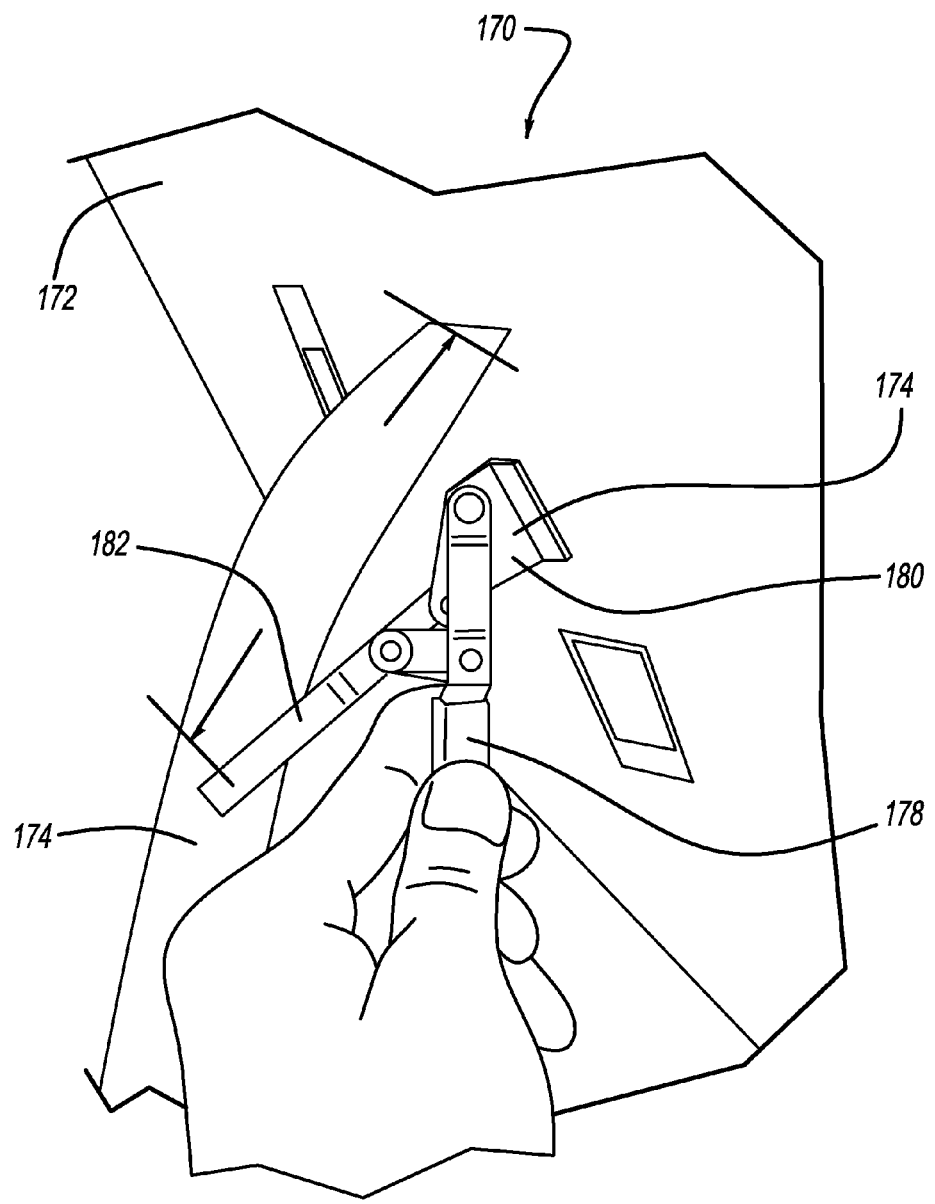
FIG. 11 is a view similar to that of FIG. 10 but illustrating the pull strap actuator moved to its operating position whereby a portion of the seat back is drawn in to reveal the CRS anchor.

While FIGS. 7, 8 and 9 illustrate the tether strap adjuster 136 as the mechanism for selectively locking and tether strap 139, other approaches to locking and holding the tether strap 139 are possible, as illustrated in FIGS. 10 and 11.

Referring to FIGS. 10 and 11, a portion of a seat, generally illustrated as 170, is shown. The seat 170 includes a seat back 172. A tether strap 184 is shown passing through the seat back 172. The tether strap 184 is connected at one end to a seat back drawing in assembly as shown in FIGS. 7 and 8 and as described in conjunction therewith. It is to be understood that while the tether strap 184 is illustrated as being associated with the seat back 172 it can alternatively or additionally be associated with the seat base (not shown).

A tether strap moving and locking assembly 176 is associated with the seat back 172 (or seat base as the case may be) to move and selectively hold or release the tether strap 184. It is to be understood that the tether strap moving and locking assembly 176 as shown is for illustrative purposes only and that the lock may be smaller than that illustrated relative to the seat 170.

The tether strap moving and locking assembly 176 includes a movable handle 178 that is pivotably attached to an assembly base 180. The assembly base 180 is fixed to the seat back 172. An assembly clamp 182 is attached to the tether strap 184 and is operatively associated with the movable handle 178 and the assembly base 180.

In FIG. 10, the resting position of the tether strap moving and locking assembly 176 is illustrated. In this position, the tether strap 184 remains drawn into the seat back 172 and the seat back displacing assembly (not shown) is in its non-displaced position. In the event that access to the CRS anchor is desired, the operator moves the movable handle 178 to withdraw a portion of the tether strap 184 from the seat back 172 as illustrated in FIG. 11. Thus withdrawn, the seat back displacing assembly is displaced, exposing the CRS anchor as discussed above. Movement of the movable handle 178 to the displaced position shown in FIG. 11 also results in the locking of the tether strap moving and locking assembly 176 in its displaced position. Release of the tether strap 174 to allow the seat back displacing assembly to return to its non-displaced position is accomplished by moving the movable handle 178 back toward the seat back 172.

Referring to FIGS. 12 and 13, a sectional view of a seat according to the fourth embodiment of the disclosed inventive concept, generally illustrated as 190, is shown. The seat 190 includes a seat back 192 and a seat base 194. The seat 190 may be of any of a variety of seats and may include an external skeleton upon which the molded foam rests in or against, an external surface such as the sheet metal second row seat in a sedan, and an internal wireframe skeleton over which the foam is molded.

According to the illustrated seat 190, the non-limiting arrangement for the seat back 192 is an internal seat back frame 196 and an external seat back frame 198. The seat back 192 further includes a seat back foam 200 and seat back trim 202. The non-limiting arrangement for the seat base 194 is an internal seat base frame 204 and an external seat base frame 206. The seat base 194 further includes a seat base foam 208 and a seat base trim 210.

The seat 190 of the fourth embodiment of the disclosed inventive concept illustrated in FIGS. 12 and 13 includes a seat back foam displacing assembly 212. A CRS anchor 214 is fitted approximately between the seat back 192 and the seat base 194.

The seat back foam displacing assembly 212 includes an actuator 216 that may be composed of a variety of materials that include, for example, a bonded or molded covering on pressboard, plastic or other lightweight semi-rigid material. The actuator 216 is pivotably attached to the seat back 192 by a pivot 218. A seat back interfacing attachment member 220 is provided in operative association with the actuator 216. The seat back interfacing attachment member 220 is pivotably attached to the seat back 192 by a pivot 222. A rigid tension extension member or linkage 224 connects the actuator 216 and the seat back interfacing attachment member 220.

When in its non-displaced state as illustrated in FIG. 12, the CRS anchor 214 is hidden from view by portions of both the seat back 192 and the seat base 194. To gain access to the CRS anchor 214, a portion of the seat back 192 is displaced so that the CRS anchor 214 becomes visible as illustrated in FIG. 13.

To displace the portion of the seat back 192 to thereby render the CRS anchor 214 visible to the user, the operator manipulates the actuator 216 from its resting, non-displacing position shown in FIG. 12 to its active, displacing position shown in FIG. 13. Particularly, to allow access to the CRS anchor 214, the user rotates the actuator 216 from the position illustrated in FIG. 12 to the position illustrated in FIG. 13. Movement of the actuator 216 causes the linkage 224 to act on the seat back interfacing attachment member 220, thus displacing a portion of the seat back 192 so that it is moved out of the line of sight of the user and allows attachment of the CRS clip to the CRS anchor 214.

The system for revealing a CRS anchor according to various embodiments of the disclosed inventive concept may be employed in any vehicle seat conventionally fitted with a CRS anchor. While specific locations of the CRS anchor have been illustrated in the figures and described in relation thereto, it is to be understood that the CRS anchors may be provided in locations other than those shown and described. The illustrated and described system of revealing a CRS anchor according to the disclosed inventive concept would find application regardless of the location of the CRS anchors.

Additional and Alternative Concepts

The lower portion of the seatback, foam or rear portion of seat cushion foam could pivot slightly about an axis to reveal the anchors compared with compressing foam as set forth above whereby trim is drawn in without moving the seat structure at all. These concepts need not be limited to lower CRS anchors but might be adapted to upper CRS tether anchors if desirable for certain package configurations. In addition, the disclosed inventive concept could be applied to a either seat cushion or lower seatback at the bight-line, or both. A single user action (presumably through a cable-like attachment) could simultaneously reveal the anchors by compressing both lower seatback foam and cushion foam through one actuator. It is initially assumed the largest benefit would be achieved through minimally exposing anchors from a top viewpoint. Also it is possible to provide for clearance openings, recesses or pockets and the like for placement of the actuator and customer hand clearance to access to the actuator in the seatback, on the package tray or the like. Graphics may also be added to enhance ease of customer operation. Decorative covers as well as customer interfacing features for cosmetic and ergonomic purposes may also be added.

One skilled in the art will readily recognize from such discussion, and from the accompanying drawings and claims that various changes, modifications and variations can be made therein without departing from the true spirit and fair scope of the invention as defined by the following claims.

What is claimed is:

1. A system for selectively revealing a child safety seat anchor in a vehicle, the system comprising:
    a seat having trim;
    a seat anchor;
    an interface attachment member attached to a portion of said seat trim for displacing said portion of said seat trim to reveal said anchor; and
    an extension connection having first and second ends, said first end being an unattached end for hand-actuation by a user and said second end connected to said attachment member.

2. The system for selectively revealing a child safety seat anchor of claim 1 wherein said seat includes a seat back and wherein said attachment member and said extension connection being associated with said seat back.

3. The system for selectively revealing a child safety seat anchor of claim 1 wherein said seat includes a seat base and wherein said actuator, said attachment member, and said extension connection being associated with said seat base.

4. The system for selectively revealing a child safety seat anchor of claim 1 wherein said user-operable actuator is selected from the group consisting of a lever, a handle, and a strap.

5. The system for selectively revealing a child safety seat anchor of claim 1 further including a tension member guide.

6. The system for selectively revealing a child safety seat anchor of claim 1 wherein said extension connection is a tether strap.

7. The system for selectively revealing a child safety seat anchor of claim 6 wherein said tether strap moving and locking assembly includes a movable handle, a base to which said handle is attached, and a clamp to which said tether strap is attached.

8. The system for selectively revealing a child safety seat anchor of claim 6 further including a tether strap adjuster that includes a spring-loaded catch and a tether locking plate, whereby a portion of said tether strap is captured between said catch and said locking plate.

9. The system for selectively revealing a child safety seat anchor of claim 8 wherein said catch is pivoting and has a v-shape.

10. A system for selectively revealing a child safety seat anchor in a vehicle, the system comprising:
    a seat having trim;
    a seat anchor;
    an interface attachment member attached to a portion of said seat trim, said attachment member being selectively movable between a first, anchor-concealing position to a second, anchor-revealing position; and
    an extension connection having a first end that is unattached for hand-actuation by a user and a second end connected to said attachment member.

11. The system for selectively revealing a child safety seat anchor of claim 10 wherein said seat includes a seat back and wherein said attachment member and said extension connection being associated with said seat back.

12. The system for selectively revealing a child safety seat anchor of claim 10 wherein said seat includes a seat base and wherein said actuator, said attachment member, and said extension connection being associated with said seat base.

13. The system for selectively revealing a child safety seat anchor of claim 10 wherein said user-operable actuator is selected from the group consisting of a lever, a handle, and a strap.

14. The system for selectively revealing a child safety seat anchor of claim 10 further including a tension member guide.

15. The system for selectively revealing a child safety seat anchor of claim 10 wherein said extension connection is a tether strap.

16. The system for selectively revealing a child safety seat anchor of claim 15 wherein said tether strap moving and locking assembly includes a movable handle, a base to which said handle is attached, and a clamp to which said tether strap is attached.

17. The system for selectively revealing a child safety seat anchor of claim 15 further including a tether strap adjuster that includes a spring-loaded, v-shaped, pivoting catch and a tether locking plate, whereby a portion of said tether strap is captured between said catch and said locking plate.

18. A seat back foam displacing assembly for use with a seat of a vehicle and an associated seat anchor, the assembly comprising:
    an interface attachment member attached to a portion of the seat, said attachment member being selectively movable between a first, anchor-concealing position to a second, anchor-revealing position; and
    an extension connection having first and second ends, said extension being continuous between said ends, said first end being an unattached end for hand-actuation by a user and said second end being connected to said attachment member.

* * * * *